United States Patent
Rajapakse

(10) Patent No.: US 9,413,799 B2
(45) Date of Patent: Aug. 9, 2016

(54) BROADCASTING MEDIA FROM A STATIONARY SOURCE TO MULTIPLE MOBILE DEVICES OVER WI-FI

(71) Applicant: Blackfire Research Corporation, San Francisco, CA (US)

(72) Inventor: Ravi Rajapakse, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 133 days.

(21) Appl. No.: 14/303,502

(22) Filed: Jun. 12, 2014

(65) Prior Publication Data

US 2014/0297815 A1   Oct. 2, 2014

Related U.S. Application Data

(63) Continuation-in-part of application No. 13/561,029, filed on Jul. 28, 2012, now Pat. No. 8,839,065, and a continuation-in-part of application No. 14/083,426, filed on Nov. 18, 2013, now Pat. No. 8,762,580, which is a continuation-in-part of application No. 11/627,957, filed on Jan. 27, 2007, now Pat. No. 8,677,002.

(60) Provisional application No. 61/833,927, filed on Jun. 12, 2013, provisional application No. 61/727,624, filed on Nov. 16, 2012.

(51) Int. Cl.
*H04J 3/06* (2006.01)
*H04L 29/06* (2006.01)
*H04L 12/18* (2006.01)

(52) U.S. Cl.
CPC ............ *H04L 65/60* (2013.01); *H04L 12/1881* (2013.01); *H04L 65/4076* (2013.01); *H04L 65/608* (2013.01); *H04L 65/80* (2013.01); *H04L 69/163* (2013.01); *H04L 69/166* (2013.01); *H04L 12/189* (2013.01)

(58) Field of Classification Search
CPC ... H04L 65/60; H04L 65/4076; H04L 65/608; H04L 65/80; H04L 69/163; H04L 69/166; H04L 12/1881; H04L 12/189
USPC .................................................. 370/503–519
See application file for complete search history.

(56) References Cited

U.S. PATENT DOCUMENTS

| | | | | |
|---|---|---|---|---|
| 2008/0040759 | A1* | 2/2008 | She | H04L 29/06027 725/81 |
| 2009/0323822 | A1* | 12/2009 | Rodriguez | H04N 21/4147 375/240.25 |
| 2012/0154678 | A1* | 6/2012 | Chang | G06F 3/1454 348/500 |
| 2013/0103770 | A1* | 4/2013 | Kamolz | H04L 65/4076 709/206 |
| 2014/0281011 | A1* | 9/2014 | Zarom | H04L 65/602 709/231 |
| 2014/0297797 | A1* | 10/2014 | Rajapakse | H04L 65/1066 709/217 |
| 2014/0297815 | A1* | 10/2014 | Rajapakse | H04L 65/4076 709/219 |
| 2015/0358654 | A1* | 12/2015 | Zhang | H04N 21/242 725/62 |

* cited by examiner

*Primary Examiner* — Thai Hoang
(74) *Attorney, Agent, or Firm* — Galvin Patent Law LLC; Brian R. Galvin

(57) ABSTRACT

A system for synchronized media playback to multiple mobile receiver devices, comprising a network-connected media source device that prepares media content for viewing by separating it into a plurality of media streams, a plurality of network-connected media receiver devices that each receive a plurality of media streams and synchronize their playback relative to one another, and a method for providing synchronized media playback to multiple receiver devices.

6 Claims, 6 Drawing Sheets

BROADCASTING MEDIA FROM A STATIONARY SOURCE TO MULTIPLE MOBILE DEVICES OVER WI-FI

CROSS-REFERENCE TO RELATED APPLICATIONS

This application claims the benefit of, and priority to, U.S. provisional patent application Ser. No. 61/833,927, titled "SYNCHRONOUS PLAYBACK OF MEDIA USING A WI-FI NETWORK WITH THE MEDIA ORIGINATING FROM A BLUETOOTH SOURCE", filed on Jun. 12, 2013, the entire specification of which is incorporated herein by reference. This application is also a continuation-in-part of U.S. patent application Ser. No. 13/561,029, titled "PACKET LOSS ANTICIPATION AND PRE EMPTIVE RETRANSMISSION FOR LOW LATENCY MEDIA APPLICATIONS" filed on Jul. 28, 2012, and is a continuation-in-part of U.S. patent application Ser. No. 14/083,426, titled "COMMON EVENT BASED MULTI DEVICE PLAYBACK, filed on Nov. 18, 2013, which is a continuation-in-part of U.S. patent application Ser. No. 11/627,957, titled "Streaming Media System and Method" and filed on Jan. 27, 2007, and also claims a benefit of, and priority, to U.S. provisional patent application Ser. No. 61/727,624, filed on Nov. 16, 2012, titled "COMMON EVEN BASED MULTIDEVICE MEDIA PLAYBACK" the entire specification of each of which is incorporated herein by reference.

BACKGROUND OF THE INVENTION

1. Field of the Art

The disclosure relates to the field of multimedia consumption, and more particularly to the field of broadcasting multimedia content to mobile receiver devices.

2. Discussion of the State of the Art

Today there are many mobile devices such as multimedia players, smartphones, tablet computers, or other various mobile electronic devices, that have the ability to play media to a wireless playback device (such as a speaker, stereo receiver, or television) over a radio-based wireless link such as BLUETOOTH™ or WiFi wireless data transmission protocols. If the user desires to split the media playback, for example to broadcast a video content stream to one receiver (such as a television) and a corresponding audio stream to a separate receiver (such as a pair of headphones, so as to not disturb others nearby while viewing media content), no such system is available.

What is needed, is a system to take a plurality of media content streams, and enable broadcasting of each stream or of portions of a single stream to separate receiver devices, while keeping the delay between the rendering of these streams (latency) low and maintaining synchronized playback of these streams so as not to degrade the quality of the experience. So for example if a video content stream is sent to a TV and an audio content stream is sent to wireless headphones (for example), the audio media that corresponds to the video must not be too delayed with respect to the video (defined in the art as latency), to a degree that a user might notice this delay and thereby degrading the users media experience. Furthermore if two or more users are listening to audio content, it may be desirable that the rendering of this content is synchronous, so that all users experience the audio at the same time.

A very specific desirable application may be that of a WiFi enabled "smart" TV, or WiFi set top box that may present video media content to a television while simultaneously sending audio content wirelessly over a WiFi network to one or more smartphones that may be used by users watching the TV screen. The smartphones may then play the audio content received wirelessly over the WiFi network through ear buds (or similar audio playback hardware) that a user is using.

Such an arrangement allows a user to experience the video component of the media on the TV and the audio component of the media through their smartphone and therefore not disturb other occupants in the room. For this experience to be effective the media must be transported over a wireless network such as a WiFi network, which is generally built into smartphones (and other personal media devices in the art, such as music players, tablet computing devices, or other suitable portable electronic devices) as an integral hardware feature, the latency of the audio component played via the smartphone must be low with respect to the video component played on the TV (so as not to degrade the user experience as described above) and if multiple users are watching the TV video content, all audio components being played must be time synchronized such that the playback experience is similar for each individual user. Low latency transport of media over WiFi and media playback synchronization over WiFi presents many challenges that the invention aims to solve, as described herein.

SUMMARY OF THE INVENTION

Accordingly, the inventor has conceived and reduced to practice, in a preferred embodiment of the invention, a system and method for low latency synchronized media broadcast to multiple receiver devices, that enables the broadcast of portions of a media stream (or multiple separate streams) to different receiver devices simultaneously.

According to a preferred embodiment of the invention, a system and method for synchronized media broadcast to multiple receiver devices comprising a media source (such as a software music player, cable or satellite television broadcast receiver (Set Top box), Smart TV, or other appropriate hardware or software media source), and a plurality of media receiver devices (such as WiFi enabled audio devices such as headphones or speakers, individual client media player software applications, music player devices, smartphone or other mobile devices, speakers, television, or any other appropriate software or hardware media playback device), is disclosed. According to the embodiment, a media source may broadcast media content to receiver devices, as is common in the art. Prior to broadcast, media content may optionally be separated into multiple content streams, for example by separating audio channels in a multi-channel arrangement (such as for stereo or surround sound), or by separating an audio stream from a video stream in media containing both (for example, a movie). These separate media streams may then be broadcast to separate receiver devices, in either a multicast (sending a single media stream to multiple receivers) or unicast (sending one stream to one device, and another stream to a different device) manner interchangeably or simultaneously. For example, in a use where a movie with five-channel surround sound audio is being viewed on a system including a television and two speakers, a video stream may be unicast to a television, while the audio channels are simultaneously multicast to each of the receivers. To preserve synchronization between multiple devices, a synchronization method such as the COMMON EVENT synchronization method referred to above may be used. Other synchronization methods may also be used. In this manner, all devices may play media in the correct timing relative to one another and to the media source, so that synchronicity is preserved during playback. To reduce the delay between the rendering of the video and the audio a low latency method such as the LAP method referred to above is used. Other methods for reducing latency may be applicable.

In another preferred embodiment of the invention, a method for providing synchronized media playback to multiple receiver devices is disclosed. According to the embodiment, in a first step a media source may select a media file (such as a movie or music track) for viewing, and may provide this file for playback on devices (such as speakers, televisions, mobile devices, or any other appropriate media devices or software applications). In a next step, the media may be split into multiple content streams, such as separate audio channels or separate audio and video streams. In a next step, these streams may then be broadcast to receiver devices according to the desired playback arrangement, such as sending a video stream to a television or other video viewing device and simultaneously sending one or more audio streams to separate speakers for playback. In a final step, receiver devices may coordinate their playback using a timing source such as the media source or other reliable centralized source, such that they remain in sync with one another and playback continues in a synchronized fashion.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
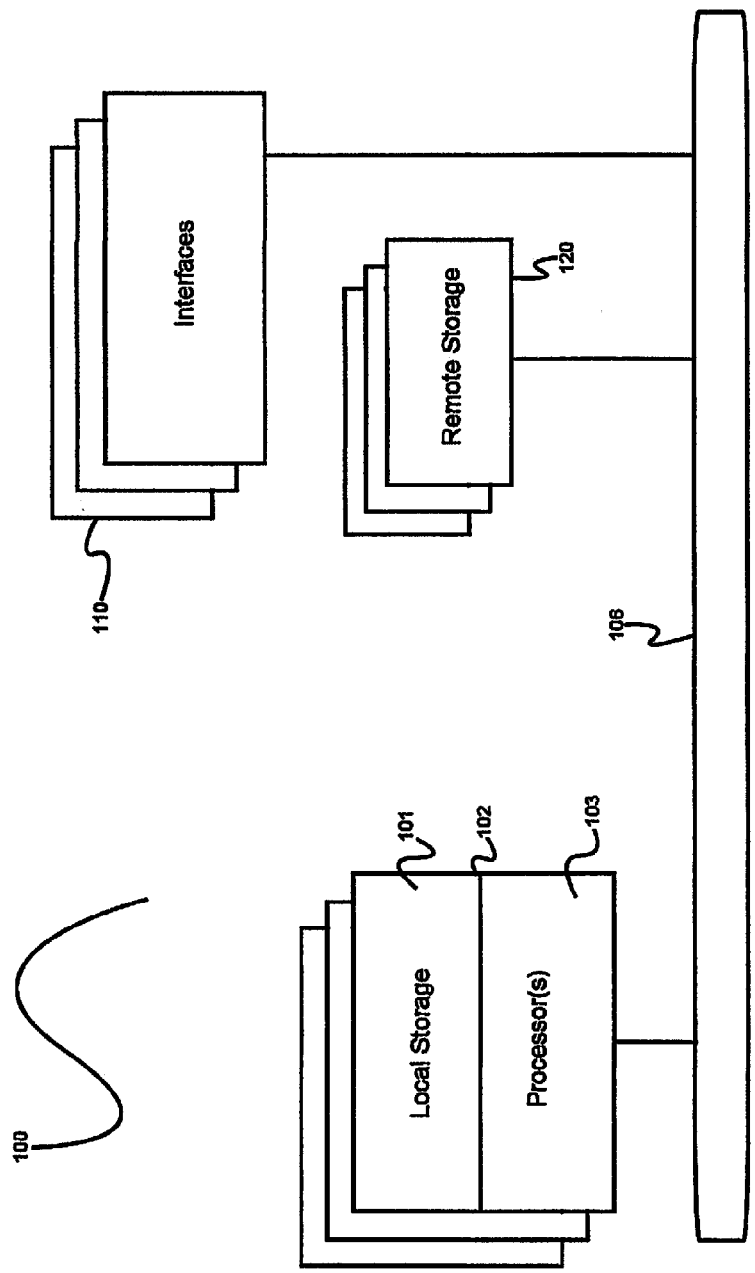
FIG. 1 is a block diagram illustrating an exemplary hardware architecture of a computing device used in an embodiment of the invention.

Accordingly, the inventor has conceived and reduced to practice, in a preferred embodiment of the invention, a system and method for synchronized media broadcast to multiple receiver devices, that enables the broadcast of portions of a media stream (or multiple separate streams) to different receiver devices simultaneously.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
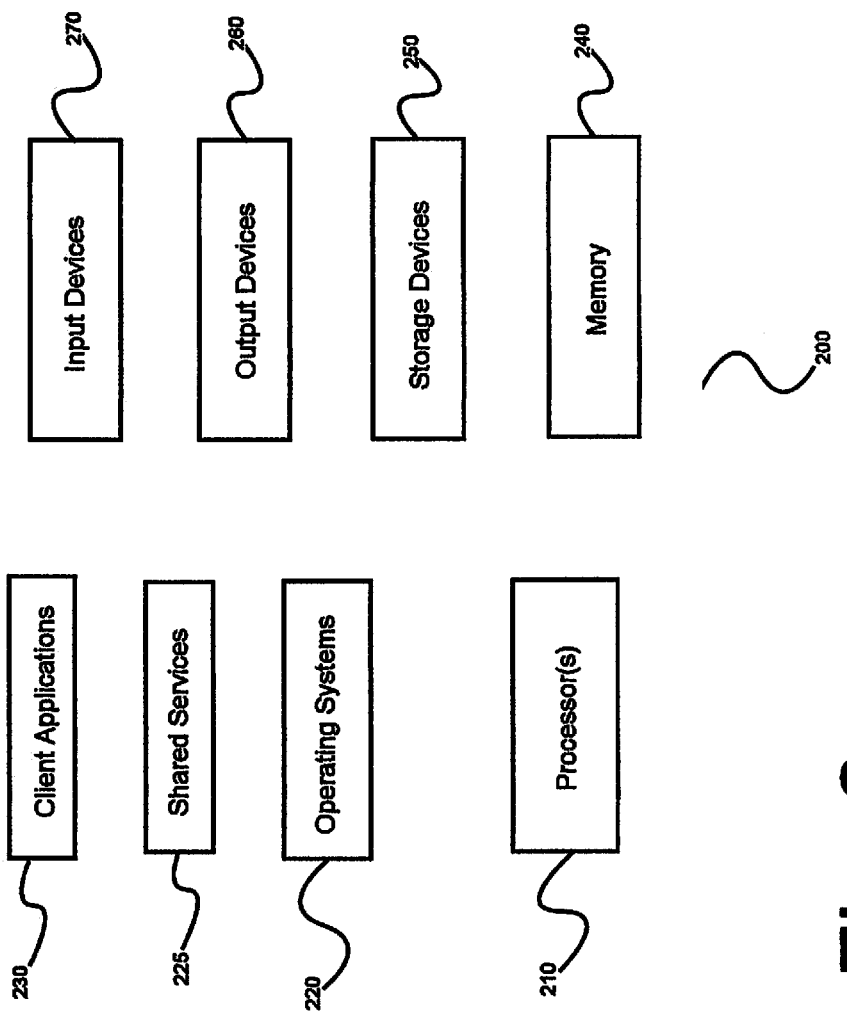
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
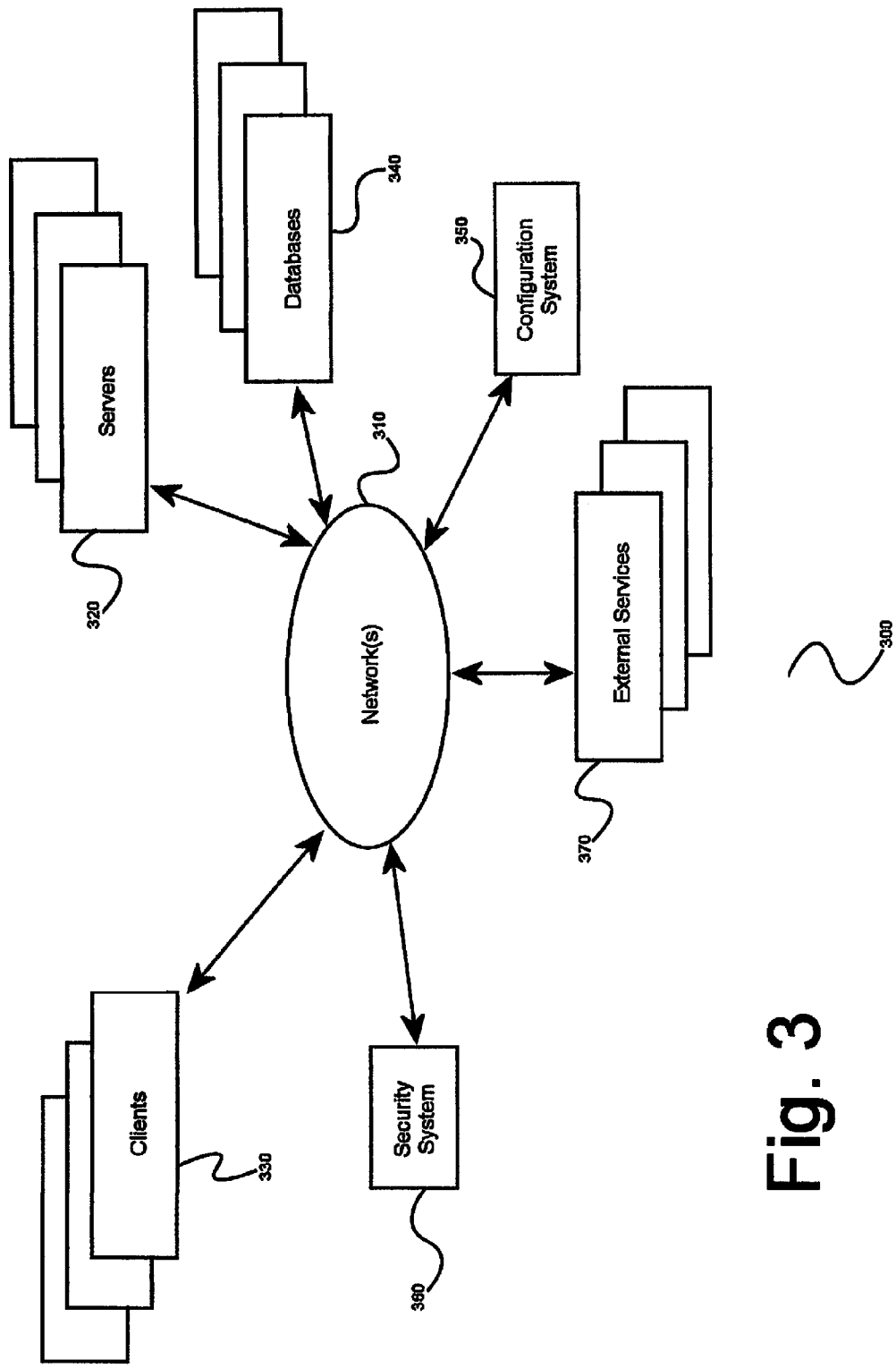
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
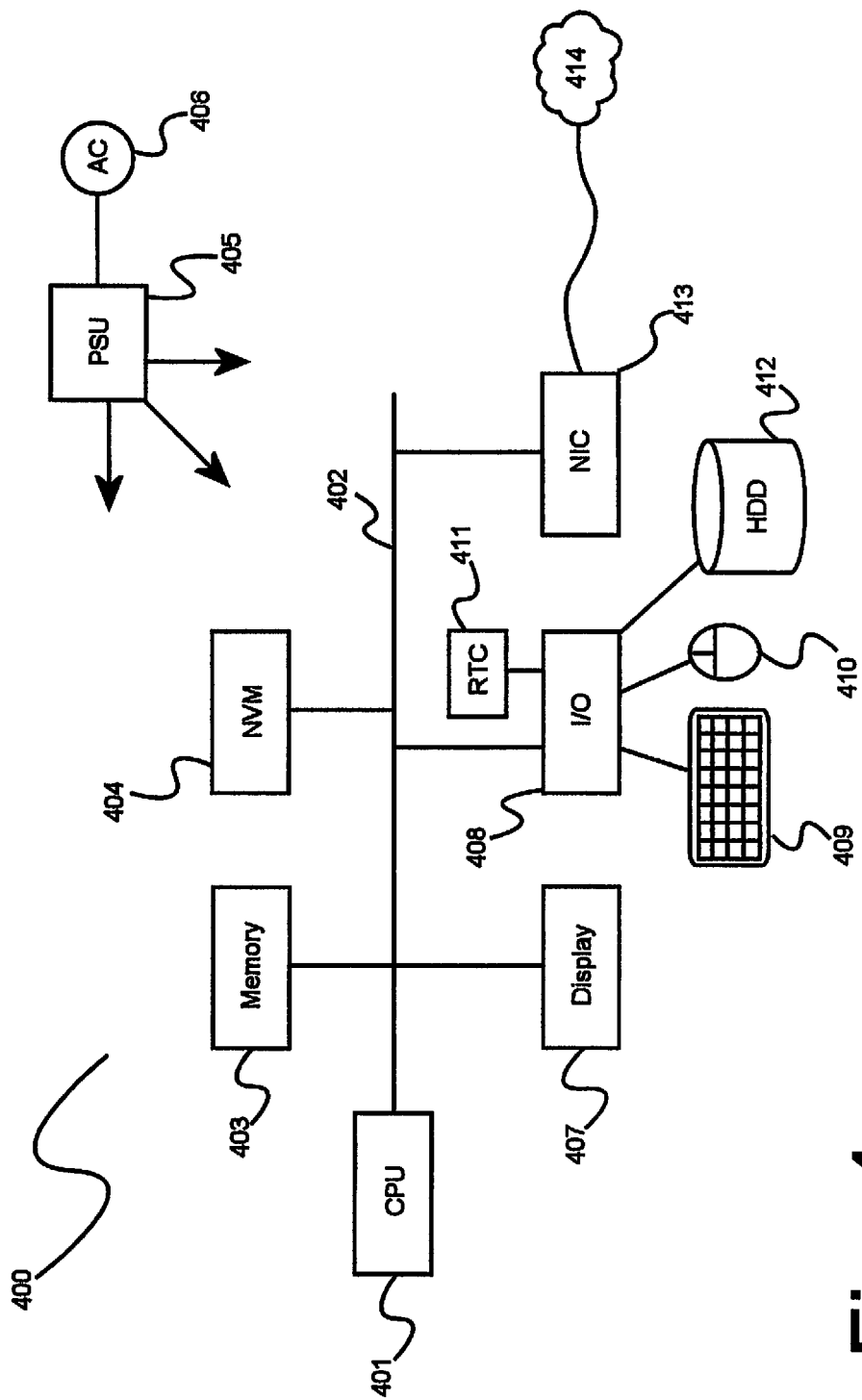
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
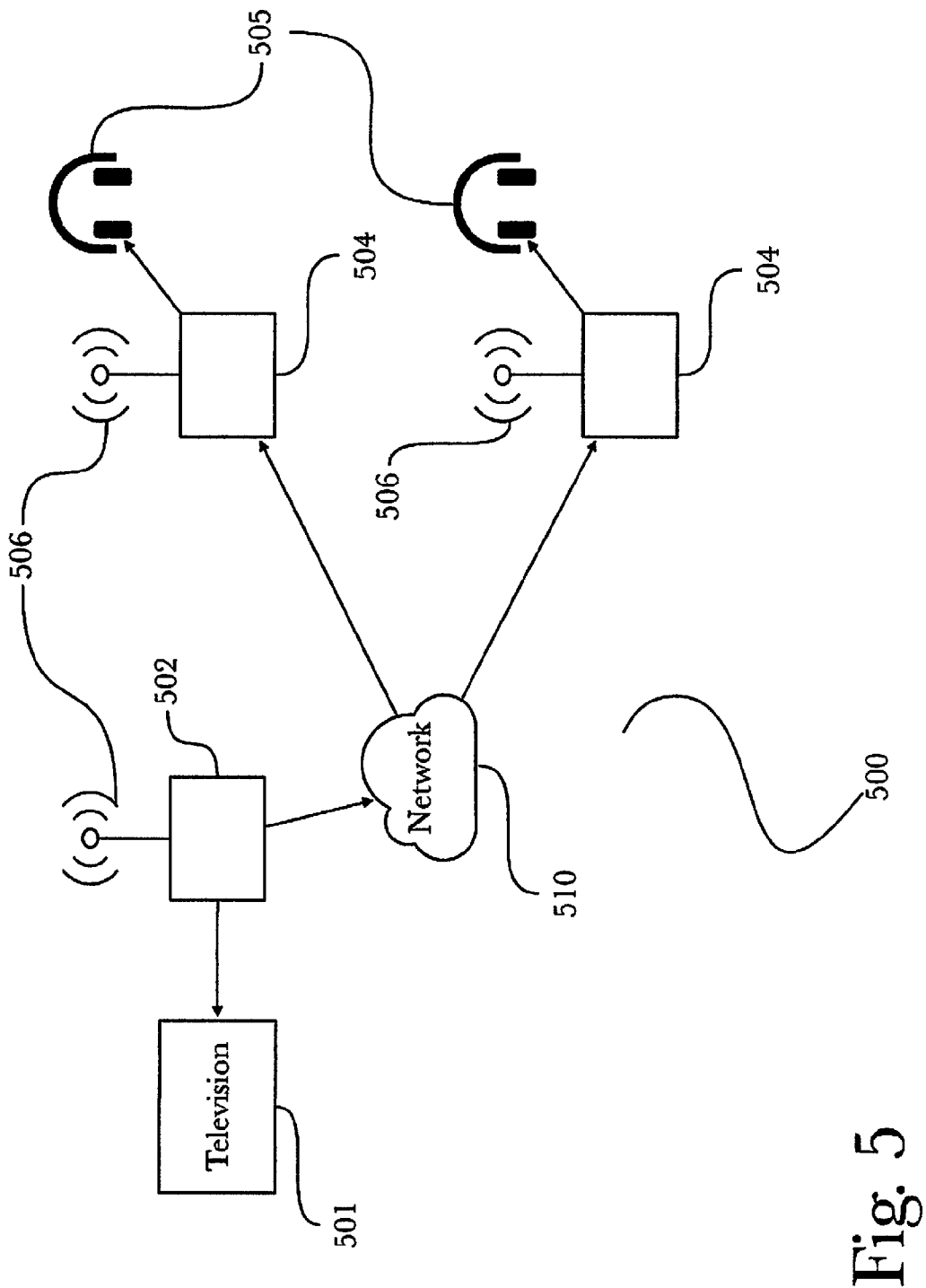
FIG. 5 is a system architecture diagram, illustrating an exemplary system for synchronized media broadcast to multiple receiver devices, according to a preferred embodiment of the invention.

FIG. 5 is a system architecture diagram, illustrating an exemplary system 500 for synchronized media broadcast to multiple receiver devices, according to a preferred embodiment of the invention. According to the embodiment, a television 501 may be connected to a media output of a set top box 502 (such as a cable or satellite receiver, cassette or disc player, or other appropriate media device). The set top box 502 may be connected to a media source 503 such as cable TV, satellite TV or internet-based media source, or any other suitable media source or combination of sources. The set top box 502 may also be network-enabled, such that it may connect to a network 510 such as the Internet (via either wired or wireless means as appropriate, according to the nature and capabilities of the device), and may transmit and receive data messages 507 via a network interface 506 such as a wireless antenna or Ethernet cable. In some embodiments the TV 501 may be a "smart TV" with some or all of the capabilities of the set top box 502 (such as the ability to receive satellite or cable TV signals or internet access) included as an integral feature. It should be appreciated that the term "set top box" is used herein to refer to any traditional cable or satellite receivers and may also refer to additional or alternate devices that connect to a TV such as networked media devices. A TV 501 and set top box 502 together, or a smart TV 501, may be considered a media source according to the embodiment. In most arrangements, such devices are typically stationary and not very close to a viewer.

According to the embodiment, one or more mobile devices 504 may be connected to the network 510 such as via a common wireless network protocol such as WiFi, using appropriate network interfaces (such as a WiFi radio) 506. Each mobile device 504 may be connected to an audio rendering device 505 such as a speaker or headphones (or any other suitable device for receiving or playing audio). The audio device 505 may be integral to or a component of the mobile device 504, such as an integral speaker, or it may be external to the mobile device 504 such as a pair of removable headphones. It should be appreciated that a mobile device 504 may be any suitable mobile electronic device, such as including (but not limited to) a smartphone, tablet computer, personal media player, network-capable wired or wireless headphones or speakers, or any other such mobile device that may be used to store, receive, play, or otherwise utilize media information. It should also be appreciated that there may be many such mobile devices being utilized in a joint configuration, such as in a home theater arrangement where there may be a multi-channel arrangement of speakers, for example to achieve "surround sound", or as with multiple viewers of the same video content on a TV. Mobile devices 504 and audio rendering devices 505 may be together considered mobile media receivers according to the embodiment. These devices are typically mobile and very close to the user or viewer. In a surround sound arrangement described above, each speaker will generally render one channel of the audio, whereas in a singular configuration (that is, playing media via a single device rather than multiple devices used jointly) all channels may be played via the same device and audio fidelity may be lost.

According to the embodiment, a video portion of a media stream may be rendered on a television 501 that is connected to a set top box 502. The set top box 502 may simultaneously transmit an audio portion of the media over a network to one or more mobile devices 504. The mobile devices 504 may receive the audio portion of the media and render the audio to an appropriate audio output device 505 such as a connected pair of headphones, or an integral speaker. In order for the media to be rendered simultaneously and in phase (that is, all devices playing the media in a synchronous fashion so that each device is consistently playing the same portion of the media and at the same rate), each device may implement a media synchronization mechanism, such as that described in a COMMON EVENT synchronization mechanism. This synchronization of playback requires the adjustment of the rendering at the rendering device. Since the rendering device in this application is a smartphone and there is limited control of the smartphone hardware, the synchronization technique described in the COMMON EVENT mechanism is particularly appropriate as it does not require low level hardware control.

In order for a TV 501 to broadcast audio simultaneously to multiple mobile devices 504 when playing the same media channels (e.g. stereo) on all the mobile devices, the media may be either multicast over the network to the mobile devices (that is, a single media source may be simultaneously broadcast to multiple devices from the source device, in this case the TV or set top box) or the media samples or frames may be copied for each playback device and each copy may then be unicast over the network to each mobile device (that is, a separate identical media source may be individually broadcast to each device for playback). For such an approach to work effectively, it is critical that the delay in rendering the audio portion of the media via the mobile devices be very low so that the audio rendering at the audio device 505 stays in sync with the video portion of the media being played on the TV screen, hence it is necessary to keep this delay low with a method such as that described in the LAP mechanism above.

In additional situations, a TV 501 (or other media source) may broadcast a video portion of the media content to a mobile device 504 as well as an audio portion, allowing a user to view both parts of the media on the mobile device (rather than splitting the media into streams being broadcast and played on different devices, as described above). For example, a mobile device 504 may be a smartphone that receives both audio and video media from the TV 501 and renders both media channels on the smartphone. This allows a user to see the video close up and use an audio device 505 such as a pair of connected headphones to hear the audio, effecting a personal media experience that will not disturb others nearby or affect their own media playback. Furthermore, it will be appreciated that the TV may be broadcasting media to many such mobile devices such as for multiple viewers in a viewing room, or to separate locations connected via the network 510 such as for multiple users viewing the media from separate locations (for example, a family watching a movie together from different rooms of the house).

It should be appreciated that while reference is made to Internet connectivity using WiFi wireless communication, any data transmission network may be utilized alternately, such as BLUETOOTH™, Ethernet or other wired network connection, cellular radio connection such as CDMA or GSM networks, or any other such appropriate connectivity means for devices to transmit and receive media content. In this manner, the system and method of the invention may be utilized to facilitate synchronous playback according to the invention regardless of a particular user's network configuration, and without requiring specific capabilities from a user's device or devices, and the invention may be readily implemented with a wide variety of arrangements and devices used simultaneously or interchangeably, without impacting the utility described herein.

Detailed Description of Exemplary Embodiments

Figure 6:
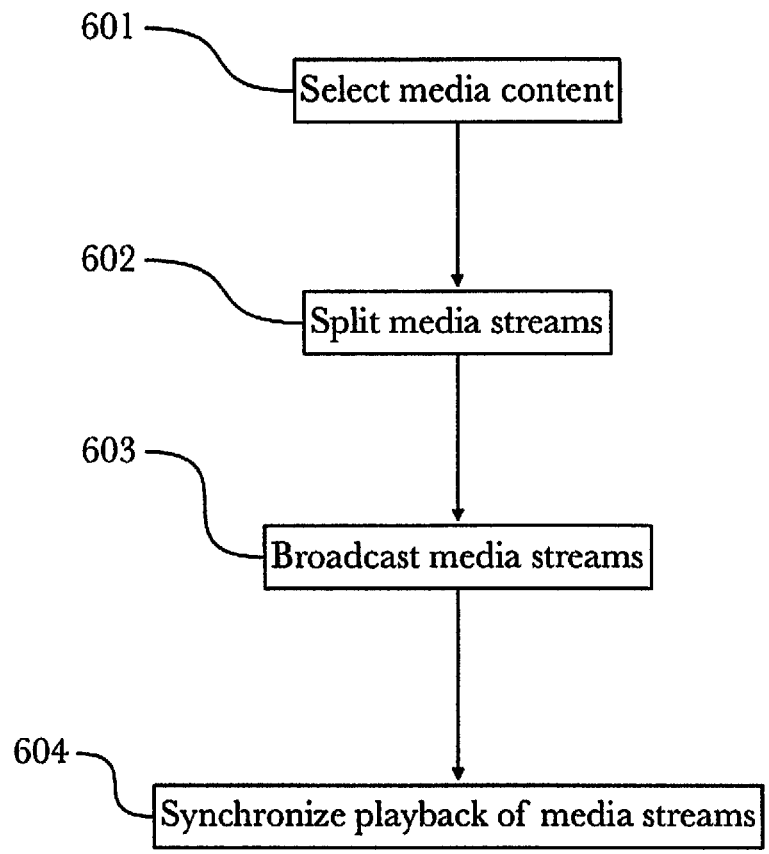
FIG. 6 is a method flow diagram, illustrating an exemplary method for providing synchronized media broadcast to multiple receiver devices, according to another preferred embodiment of the invention.

FIG. 6 is a method flow diagram, illustrating an exemplary method 600 for providing synchronized media broadcast to multiple receiver devices, according to another preferred embodiment of the invention. In a first step 601, media content may be selected and provided for viewing by a media source device, such as a media player or television set top box. In a next step 602, the media content may be split for viewing on multiple receiver devices, for example by separating different audio channels (as are common in stereo, surround sound, or other multichannel audio configurations) or by separating an audio media stream from a corresponding video content stream (such as would be present in a movie, for example). In a next step 603, media streams may be broadcast individually or jointly to media receiver devices such as media players, televisions, mobile electronics, speakers, or other appropriate media devices according to a particular media type or use case. For example, a movie might be separated into video and audio streams in a previous step 602, the video stream being broadcast to a television and the audio stream being broadcast separately to a speaker. Another example might be the broadcast of selected audio channels to one media device, for example sending stereo English dialog to a speaker system, while simultaneously broadcasting a different audio stream or combination of streams to another device, such as sending a monaural foreign-language audio stream to a set of headphones being used by a non-English speaker wishing to view the same movie at the same time. In this manner, it can be appreciated that a variety of uses become possible by combining various media content streams in various arrangements, and sending them to various devices according to a particular desired operation. In a final step 604, the media receiver devices may operate media synchronization systems to ensure media is played in a synchronous fashion and with low latency.

The skilled person will be aware of a range of possible modifications of the various embodiments described above. Accordingly, the present invention is defined by the claims and their equivalents.

What is claimed is:

1. A system for broadcasting media from a stationary source to multiple mobile devices over Wi-Fi, comprising:
    a media source stored in a memory of and operating on a processor of a first network-connected and physically stationary electronic device;
    a plurality of media receivers each respectively stored in a memory of and operating on a processor of a network-connected mobile electronic device, each further comprising a synchronization module that directs the rendering of media content;
    wherein the media source broadcasts media content via a network; and
    wherein at least a portion of the plurality of media receivers receives at least a portion of the media content from the media source and renders at least a portion of the received content in a synchronized manner with regard to the media source, using the synchronization module.

2. The system of claim 1, further comprising a media synchronization system stored in a memory of and operating on a processor of a network-connected electronic device, wherein the media synchronization system directs the operation of a synchronization module on a media receiver for synchronized playback of media.

3. The system of claim 2, wherein the media synchronization system operates on the media source.

4. The system of claim 2, wherein the media synchronization system operates on at least the first media receiver.

5. A method for broadcasting media from a stationary source to multiple mobile devices over Wi-Fi, comprising the steps of:
    broadcasting, from a media source stored in a memory of and operating on a processor of a first network-connected and physically stationary electronic device, media content;
    receiving, at a plurality of media receivers each stored in a memory of and operating on a processor of a first network-connected mobile electronic device, at least a portion of the media content; and
    directing, using a synchronization module operating on at least one of the plurality of media receivers, the rendering of media content in a synchronized fashion with regard to the media source.

6. The method of claim 5, further comprising the step of synchronizing, using a media synchronization system, playback of the media content on all devices synchronously.

* * * * *